United States Patent
Wasson et al.

(10) Patent No.: US 6,817,179 B1
(45) Date of Patent: Nov. 16, 2004

(54) POPPET FOR CENTER PORT COMPENSATION VALVE

(75) Inventors: Andrew Wasson, South Bend, IN (US); John Krummen, Granger, IN (US); Kerry Springer, Brighton, MI (US)

(73) Assignee: Robert Bosch Corporation, Broadview, IL (US)

( * ) Notice: Subject to any disclaimer, the term of this patent is extended or adjusted under 35 U.S.C. 154(b) by 126 days.

(21) Appl. No.: 10/246,101

(22) Filed: Sep. 18, 2002

(51) Int. Cl.[7] ................................................ B60T 11/20
(52) U.S. Cl. .......................................... 60/562; 60/589
(58) Field of Search .......................... 60/562, 589, 592

(56) References Cited

U.S. PATENT DOCUMENTS

| | | | | |
|---|---|---|---|---|
| 4,417,445 A | * | 11/1983 | Furuta | 60/554 |
| 5,018,353 A | * | 5/1991 | Pugh | 60/562 |
| 5,111,661 A | * | 5/1992 | Savidan et al. | 60/562 |
| 5,207,062 A | * | 5/1993 | Wilson et al. | 60/562 |
| 5,279,125 A | * | 1/1994 | Keyes et al. | 60/562 |
| 5,943,863 A | * | 8/1999 | Jordan | 60/562 |
| 6,402,263 B1 | * | 6/2002 | Wasson | 60/562 |

\* cited by examiner

Primary Examiner—Thomas E. Lazo
(74) Attorney, Agent, or Firm—Leo H McCormick, Jr.; Warren Comstock

(57) ABSTRACT

A master cylinder having first and second chambers respectively connected to a reservoir and to front and rear wheel brakes in a brake system. First and second center port compensation valves each have a head that is connected to a stem that joins a first retainer with a second retainer to cage a first spring of the first and second, resilient means. Each head is urged into engagement with a seat by a second spring to terminate communication from between the bore and reservoir on compression of the first spring in response to an input force being applied to the first piston to initiate a brake application. The head has a cylindrical body with an annular axial projection that extends therefrom to define a face and a resilient ring that surrounds the annular projection with a lip that axially extends beyond the face.

10 Claims, 2 Drawing Sheets

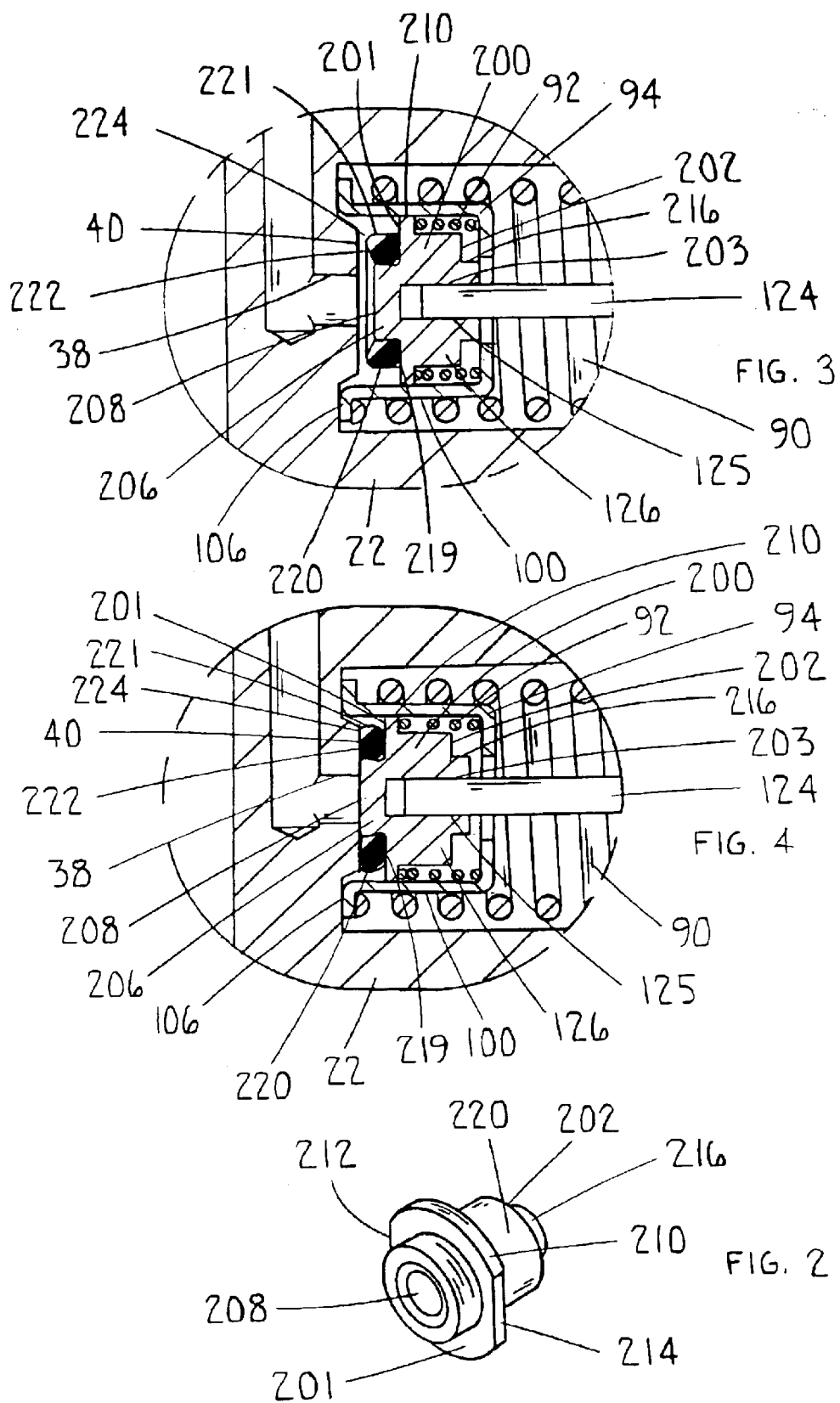

POPPET FOR CENTER PORT COMPENSATION VALVE

This invention relates to a poppet for a center port valve located in a bore of a master cylinder to control communication between the bore and a reservoir.

BACKGROUND OF THE INVENTION

U.S. Pat. Nos. 5,018,353 and 5,111,661 disclose master cylinders wherein compensation between a first chamber in a bore of a housing and a reservoir occurs through a single center port compensation valve associate with a first piston and between a second chamber in the bore through a relationship established between a radial port and sealing structure carried on a second piston. In order to eliminate the possibility of cutting a nub in a seal by extrusion into the radial port, U.S. Pat. Nos. 5,207,062; 5,279,125 and 5,943,863 disclose the use of a second center port compensation valve through which compensation is achieved for the second operational chamber in a bore. Most such master cylinders have a separate compensation valve for the first and second pressurizing chambers in the bore through which communication typically occurs through ports when the first and second pistons are in a rest position. As the first and second pistons approach the rest position, a stop pin engages the compensation valve to open the compensation valve and initiate communication between the bore and reservoir. Unfortunately, the passage required to connect the rear chamber is quite long as the compensation port needs to be located adjacent the end of the housing of the master cylinder. In addition, when such master cylinders are recessed into a front chamber of a vacuum brake booster care needs to be taken with respect to sealing structure to assure that vacuum does not draw fluid into the vacuum brake booster. While this type master cylinder functions in an adequate manner under some circumstances, the fluid pressure generated during a brake application may extrude a portion of a poppet into a compensation port leading to a reservoir and as a result it may be possible to cut the face on the poppet to an extent that a leak may develop between the bore and the reservoir during a brake application.

SUMMARY OF THE INVENTION

A primary object of the present invention is to provide a brake system with a valve arrangement whereby a face on a poppet engages a sealing surface without being extruded into a compensation port during a brake application.

According to this invention, a brake system is equipped with a master cylinder having a housing with a bore that is connected through axial port in the bottom of the bore and a radial port with a reservoir and to the brake system through first and second outlet ports. First and second pistons are positioned in the bore by a first resilient means located between the first and second pistons to define limits for a first chamber and by a second resilient means located between the second piston and the bottom of the bore to define limits for a second chamber. The first and second resilient means each include a first spring and a second spring with the first spring caged between a first retainer and a second retainer to define a linkage member. The linkage member has a stem with a head that engages the first retainer and an end that is screwed into a poppet member that is concentrically located in the second retainer. The second spring is located between the head and the second retainer member. The first chamber is connected to the radial port through an axial passage in the second piston while the second chamber is connected to the axial port in the housing. The first and second pistons respond to an input force applied to the first piston by initially moving within the bore to compress the first springs of the first and second resilient means and allow the second springs to simultaneously move the poppet associated with the first resilient means into engagement with the axial passage or port into the second piston and the poppet associated with the second resilient means into engagement with the axial port into engagement with the housing to terminate communication between the bore and the reservoir. Further movement of the first and second pistons by the input force pressurizes fluid in the first and second chambers that is provided to the brake system through the first and second outlet ports for effecting a brake application. As the poppets come into respective engagement the second piston and bottom of the housing, a lip on a resilient ring located in an axial projection of a cylindrical body initially engages a seat in an annular point contact to interrupt communication between the bore and the reservoir and as the fluid pressure develops in the first and second chambers, the fluid pressure and the second springs urge the cylindrical body toward the seat as the resilient ring is compressed with the lip being radially extruded such that when the face on the cylindrical body engages the seat, the compression of the resilient ring ends and a sealing engagement extends along a substantially length of the lip to seal the bore from the reservoir.

An advantage of this brake system is provided by utilizing a head attached to a stem of a linkage component that cages a spring as a poppet for a compensation valve to control communication between a reservoir and the bore of a master cylinder.

A still further advantage of this invention is provided by utilizing a cylindrical body of a head for a caging arrangement as a poppet for a compensation valve wherein a resilient member retained on an axial projection that extends from the cylindrical body has a lip that engages a seat as the cylindrical body is moved toward a seat and the resilient member is compressed such that once the axial projection engages the seat the lip will have been radially extruded and a sealing surface extended from an annular point contact to substantially an entire face of the lip.

BRIEF DESCRIPTION OF THE DRAWINGS

FIG. 2 is an enlarged perspective view of a cylindrical body of a head for a valve of FIG. 1;

FIG. 3 is an enlarged sectional view of a cylindrical body with a resilient ring attached thereto to define a poppet for the master cylinder of FIG. 1 wherein a lip on the resilient ring carried by a cylindrical body has been moved into initial engagement with a seat to interrupt fluid communication between the bore and a reservoir; and FIG. 4 is an enlarged sectional view of the head of the poppet of FIG. 1 wherein a face on the resilient ring has engaged the seat through compression of the resilient ring and the lip thereon has been radially extruded to seal the bore.

DETAIL DESCRIPTION OF THE INVENTION

Figure 1:
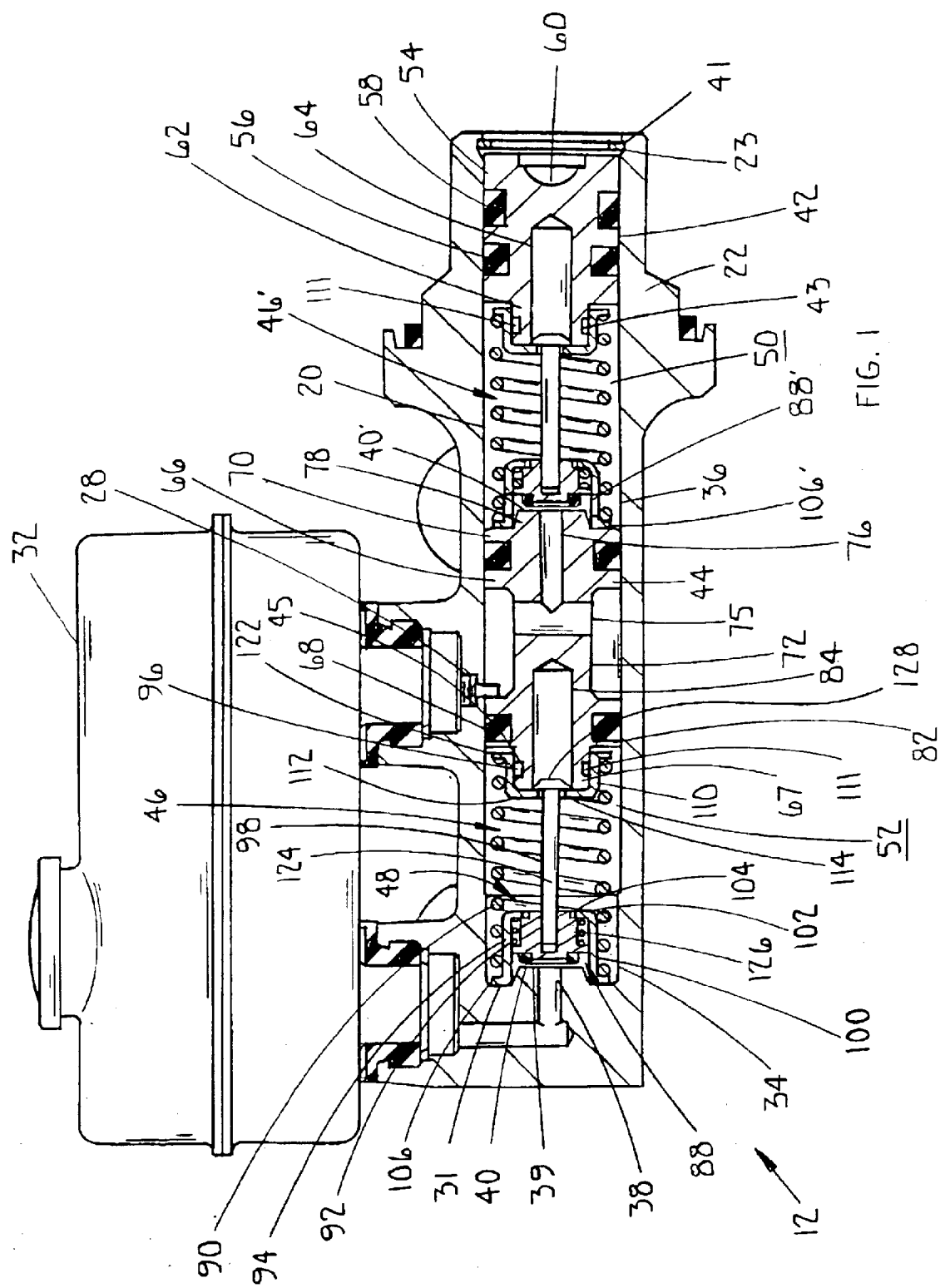
FIG. 1 is a sectional view of a master cylinder having center port compensation valves with a head connected to a stem for caging first and second resilient means that position pistons within a bore wherein the head functions according to the present invention as a poppet to seal a corresponding compensation port and allow the development of pressurize fluid on movement of the pistons to effecting a brake application.

Throughout the specification a similar component will be identified by a number in a first instance and the number plus ' in a second instance.

The master cylinder 12 illustrated in FIG. 1 is of a type disclosed in U.S. Pat. No. 5,943,863 and is designed to be connected to a brake booster. The brake booster receives an input force applied by an operator to a brake pedal by an operator and correspondingly develops an actuation force that moves first 42 and second 44 pistons located in bore 20 of housing 22 of the master cylinder 12 to pressurize fluid that is provided to front and rear wheel brakes to effect a brake application.

In more detail, master cylinder 12 has a housing 22 with a bore 20 therein. Bore 20 is connected to a reservoir 32 through an axial port 38 located in the bottom 31 of the bore 20 and through the second piston 44 by way of axial passage or port 76, cross bore 75 and radial port 28 in housing 22. Bore 20 is further connected by outlet port 34 to the front wheel brake and by outlet port 36 to the rear wheel brakes. Axial port 38 has a raised orifice 39, which could be a separate member or machined in housing 22 when bore 20 is finished, provides a seat 40 for a poppet 88 of a center port compensation valve 48 while the rear surface of the second piston 44 may be also be machined to provided a similar seating surface to define a seat 40' for a center port compensation valve 48'. The first 42 and second 44 pistons are positioned in bore 20 by resilient means 46,46' to define a first chamber 50 which is connected to outlet port 36 and a second chamber 52 which is connected to outlet port 34.

The first piston 42 has a cylindrical body 54 with grooves therein for retaining first 56 and second 58 seals to seal bore 20 from the surrounding environment, an axial depression 60 for receiving head on an output push rod from a vacuum brake booster and a projection 62 with an axial bore 64 therein.

The second piston 44 has a cylindrical body 66 with grooves for receiving seals 68 and 70 and a compensation groove 72 connected by a cross bore 75 with an axial passage or port 76. An annular projection 78 on the cylindrical body 66 surrounds axial passage or port to define a seat 40' for a center port compensation valve 48'. An annular projection 67 that extends from face 82 on piston 44 has an axial bore 84 therein.

A first resilient means 46' is located in bore 20 between the first 42 and second 44 pistons to define the limits for the first chamber 50 while the second resilient means 46 is located between the bottom 31 of bore 20 and the second piston 44 to define the limits for the second chamber 52. The length of the first 46 and second 46' resilient means is such that radial port 28 is aligned with compensation groove 72 of piston 44 and as a result cross bore 75 and port 76 are always connected with reservoir 32.

Since the first 46 and second 46' resilient means are essentially identical in structure and functional operation only the first resilient means 46 will be described in detail.

The first resilient means 46 as illustrated in FIG. 1 in bore 20 includes a first spring 90 and a second spring 92. The first spring 90 is caged between a first retainer 94 and a second retainer 96 by a linkage member 98.

The second spring 92 which is located between the first retainer 94 and a head 126 of linkage member 98 that functions as a poppet 88. The second spring 92 urges head 126 toward a seat 40' to control communication between bore 20 and reservoir 32.

The first retainer 94 has a cylindrical cone or body 100 that extends from a base 102 to define a first cup. The base 102 has an axial opening 104 while the cylindrical body 100 has an outward peripheral flange 106 on the end thereof. The end has a face with an undulating surface that allows for unrestricted flow of fluid along face when end engages either the bottom 31 of bore 20 or piston 44.

The second retainer 96 has a cylindrical cone or body 110 that extends from a base 112 to define a second cup. The base 112 has an axial opening 114. The cylindrical body 110 has a peripheral flange 122 on the end thereof that is located on projection 67 that extends from a piston 44 to align the second retainer 96 within bore 20.

The linkage member 98 includes a stem 124 that is screwed into first head 126 after passing through axial opening 114 in the base 112 of the second retainer 96 and axial opening 104 base 102 of the first retainer 94. The end 128 of stem 124 has a larger diameter that opening 114 and as a result will engage base 112 to cage the first spring 90 between the first 94 and second 96 retainers. The head 126 of stem 124 defines a poppet 88 for a center port compensation valve 48.

Head 126, which functions as a poppet, has a cylindrical body 200, as best illustrated in FIGS. 2, 3 and 4, with a first end 201 and a second end 202. The first end 201 has an annular axial projection 206 that extending therefrom to define a face 208 and a radial rib 210 with first 212 and second 214 flats thereon. The second end 202 has a projection 216 that extends from end 202 with a axial threaded bore 203 therein that extends from the second end 202 toward the first end 201. Projection 216 has a smaller diameter than opening 104 and extends through opening 104 in base 102 while the second spring 92 is caged between rib 210 and base 102. A resilient ring 220, as best illustrated in FIGS. 3 and 4, that surrounds the annular projection 206 of the cylindrical body 200 has a lip 222 that axially extends beyond the face 208. The lip 222 has a shape that resembles an inverted cone with an angle at the point of engagement with face 208 being from 30 to 45 degrees from a radial plane. The resilient ring 220 has an peripheral surface 221 that projects from a base 219 that is located adjacent face 201 at an approximate right angle such that an annular apex 224 is located in concentric axial alignment with the seat 40.

The resilient means 46,46' are manufactured as a subassembly in the following manner.

Spring 90 is placed between the peripheral flange 106 of the first retainer 94 and the peripheral flange 122 of the second retainer 96. A compressive force is applied to bring the first retainer 94 toward the second retainer 96. A second spring 92 is located in cup 100 of the first retainer 94 and a head assembly 126 brought into engagement with the second spring 92 by a force such that projection 216 of cylindrical body 200 extends through opening 104 of base 102. The first retainer 94, second retainer 96 and head 126 for stem 124 are thereafter held stationary while end 125 of stem 124 passes through axial opening and brought into engagement with threaded bore 203 in the cylindrical body 200. The cylindrical body 200 is held from rotating by engagement of a tool with flats 212 and 214 and threads 125 on stem 124 is screwed into axial threaded bore 123 to bring end 202 into engagement with base 102 to define a length between the first retainer 94 and the second retainer 96. When a desired length is achieved the compressive forces are removed from the first retainer 94, second retainer 96 and head 126 such that spring 90 is caged between the first 94 and second 96 retainers.

The resilient means 46,46' are identical and are now ready to be attached to the first 42 and second 46 pistons for assembly in a master cylinder 14. Assembly of the resilient means 46,46' with the first 42 and second 46 pistons is identical and occurs in the following manner. The second retainer 96 is moved onto a projection (62 for piston 42 and 67 for piston 46) and tabs 111, 111' are deformed into a groove (groove 43 for piston 42 and groove 45 for piston 44) to secure a resilient means 46,46' to a corresponding piston 42,44. Thereafter, the second piston 46 is inserted into bore 20 with flange 106 of resilient means 46 engaging the bottom 31 of bore 20 such that flange 106 surrounds orifice 39. Seal 68 on the second piston 46 engages bore 20 to seal chamber 52 from radial port 28 and as a result a chamber 52 is defined within bore 20. Thereafter, the first piston 44 is inserted in bore 20 with flange 106' on retainer 94' surrounding projection 78 on the second piston 44 and seal 56 engaging bore 20, to define chamber 50 within bore 20. Finally a slight compression force is applied to the end the first piston 42 and snap ring 41 inserted in groove 23 to retain the first piston 42 in bore 20.

MODE OF OPERATION

In the rest position illustrated in FIG. 1, fluid from reservoir 32 is freely communicated to chamber 52 by way of axial port 38 while fluid is communicated to chamber 50 by way of radial port 28, groove 72, passage 75 and axial passage or port 76. Fluid freely flows between reservoir 32 and to chambers 50 and 52 in bore 20 along undulations on the face of flanges 106,106' of the first retainers 94,94'. Since the radial port 28 is located at approximately the mid-point of housing 22 and communication of fluid from the reservoir 32 to chamber 50 occurs through the second piston 46, housing 22 of the master cylinder 14 can be inserted into a front chamber of a vacuum booster to create a compact unitary structure.

Once a master cylinder 12 attached to a booster are installed in a vehicle, a brake application can be effected in the following manner. An input force is applied to a brake pedal by an operator to activate the brake booster and create an operational force that is communicated through push rod to pressurize fluid in the master cylinder. Initially, the operational force acts on piston 42 to simultaneously move pistons 42 and 44 and compress springs 90,90' to allow springs 92,92' to respectively move poppets 88,88' on heads 46,46' into engagement with seats 40,40' surrounding orifices 39,39' and seal chambers 50 and 52. With ports 76 and 38 sealed further movement of pistons 42,44 will pressurize fluid in chambers 50,52 and this pressurized fluid is communicated through ports 34 and 36 to effect a corresponding brake application.

In more particular detail, the sealing chambers of 50 and 52, occurs in the following manner. Springs 92,92' moves heads 126,126' from a rest position illustrated in FIG. 1 toward seats 40,40' such that the apex 224 on lips 222,222' engage seat 40,40 with an annular point contact to interrupt communication from bore 20 toward the reservoir 32 as illustrated in FIG. 3. As springs 90,90' are further compressed through the operational force and fluid pressure is developed in chambers 50,52, the resulting fluid pressure and the force of springs 92,92' act on heads 126,126' to compress the resilient rings 220,220' to form a sealing contact surface along a surface that ultimate extends from the apex 224 to projection 206. As resilient rings 220,220' are compressed, the lips 222,222' are radially extruded to a final configuration as illustrated in FIG. 4 where face 208 engages seat 40,40'. Thereafter any further force that develops as a result of an increase in the fluid pressure acting on head 126,126 the resilient rings 220,220' are not further compressed and as a result the resilient rings 220,220' are substantially prevented from being cut, nicked or pinched as a result of engagement between the face 208,208' on projection 206,206' of head 126,126' and seat 40,40'.

When the brake application is completed, the operational force from the push rod acting on the first piston 42 ceases and springs 90,90' expand to move the linkages 98,98' back into engagement with the first 94,94' and second 96,96' retainers. As springs 90,90' expand, springs 92,92' are compressed to move heads 126,126' away from seats 40,40' to again establish communication between the reservoir 32 and chambers 50,52 and allow any needed fluid to flow into bore 20 and maintain the fluid level in the brake system at capacity.

We claim:
1. A master cylinder (12) for use in a brake system having a housing (22) with a bore (20) therein, first (42) and second (44) pistons located in said bore (20) by first (46) and second (46') resilient means to define limits for a first chamber (50) and a second chamber (52), said first (50) and second (52) chambers being respectively connected to a reservoir (32) through a first port (76) in said second piston (44) and through a second port (38) in said housing (22) to receive fluid and maintain a fluid level in said brake system at a desired level and to front (24) and rear (26) wheel brakes to effect a brake application in response to an input force being applied to said first (42) and second (44) pistons, said communication of fluid from said reservoir (32) being controlled by identical first (48) and second (48') center port compensation valves, said first (48) and second (48') center port compensation valves being defined by a head (126,126') that is connected to a stem (124,124') located between a first retainer (94,94') and a second retainer (96,96') to cage a first spring (90,90') of said first (46) and second (46') resilient means, said head (126,126') being urged into engagement with a seat (40,40') by a second spring (92,92') to terminate communication from said reservoir (32) on compression of said first spring (90,90) in response to said input force being applied to said first piston (42) to initiate said brake application, said head (126,126') being characterized by a cylindrical body (200) with an annular axial projection (206) that extends therefrom to define a face (208) and a resilient ring (220) that surrounds said annular projection (206) with a lip (222) that axially extends beyond said face (208), said lip (222) initially contacting said seat (40,40') to interrupt communication from said bore (20) to seal said first (50) and second (52) chambers and allow the development of pressurized fluid therein for effecting a brake application, said pressurized fluid acting on said cylindrical body (200) to axially compress said resilient ring (220) while radially extruding said lip (222) until said face (208) contacts said seat (40,40') to limit the compression of said resilient ring (220) while directing said lip (222) away from said axial projection (206).

2. The master cylinder (12) as recited in claim 1 wherein said lip (222) on each ring (220) is characterized as being defined by a shape that resembles an inverted cone with an angle at the point of engagement with said face (208) being from 30 to 45 degrees.

3. The master cylinder (12) as recited in claim 2 wherein said engagement of said lip (222) to interrupt communication through said port (76,38) is characterized as initially being an annular point contact that expands from an apex (224) toward said face (208) as the face (208) moves toward engagement with said seat (40).

4. The master cylinder (12) as recited in claim 3 wherein said cylindrical body (200) is characterized by first (212) and second (214) axial flats and said linkage member (98,98') is a bolt (124) with a shaft that is mated with the cylindrical body (200), said first (212) and second (214) axial flats being held stationary as said bolt (124) is screwed into said cylindrical body (200) to define a length between said first retainer (94,94') and said second retainer (96,96').

5. The master cylinder (12) as recited in claim 4 wherein said length between said first retainer (94,94') and said second retainer (96,96') is selected such that initial engagement of said lip (222,222') on each head (126,126') with a seat (40,40') occurs at the same time.

6. A master cylinder for use in a brake system, said master cylinder comprising:

a housing with a bore therein connected by a radial port and an axial port with a reservoir and through first and second outlet ports to said brake system;

a first piston located in said bore;

a second piston located in said bore;

first resilient means located in said bore between said first and second pistons to define a first chamber, said first resilient means having a first spring and a second spring, said first spring being caged between a first retainer and a second retainer by a linkage member, said linkage member having a head which engages said first retainer and an end which engages said second retainer to cage said first spring between the first and second retainers, a second spring being located between said head and said first retainer member, said first chamber being connected to said reservoir through said radial port in said housing and an axial passage in said second piston; and second resilient means located in said bore between said second piston and a bottom of said bore to define a second chamber, said second resilient means having a first spring and a second spring, said first spring being caged between a first retainer and a second retainer by a linkage member, said linkage member having a head which engages said first retainer member and an end which engages said second retainer to cage the spring between the first and second retainers and a second spring located between said head and said first retainer member, said second chamber being connected to said reservoir through said axial port in said housing, said first and second pistons responding to an input force by initially moving within said bore to compress said first springs of said first and second resilient means and allow said second springs to move said heads of said linkage members into respective engagement with said axial passage of said second piston and said axial port of said housing to terminate communication between said bore and said reservoir and thereafter move to pressurize fluid in said first and second chambers and provide pressurize fluid to said brake system through said first and second outlet ports to effect a brake application, said head of each of said linkage members being characterized by a cylindrical body with an annular axial projection that extends therefrom to define a face and a ring that surrounds said annular axial projection with a lip that axially extends beyond said face, said lip initially engaging a seat to terminate communication between said bore and said reservoir seal while said face subsequently moves toward said seat as said lip is axially compressed and radially extruded until said face engages said seat to limit the axially compression of the lip.

7. The master cylinder as recited in claim 6 wherein said first retainer of said first and second resilient means each includes:

a first cylindrical body extending from a base to define a first cup, said base having an axial opening while said cylindrical body has an end with a peripheral flange, said end having an undulating surface, said undulating surface engaging said face to allow for free communications of fluid along said face.

8. The master cylinder as recited in claim 7 wherein said second retainer of said first and second resilient means each includes:

a second cylindrical body which extends from a base to define a second cup, said base having an axial opening, said second cylindrical body having an end with a peripheral flange for positioning said second retainer within said bore.

9. The master cylinder as recited in claim 8 wherein said linkage member of said first and second resilient means each includes:

a stem having a cylindrical body with a first end and a second end, said first end of said stem extending through said axial opening of said base of said first and second cups and being screwed into said head to define an axial length between said first and second bases and thereby control the movement required to bring the lip into engagement with the seat on compression of said first spring.

10. A poppet for a center port compensation valve carried by a piston in a master cylinder to control communication between a bore of a housing and a reservoir, said compensation valve having a first spring caged between a first retainer and a second retainer by a stem member to define limits for a chamber within said bore, said poppet being defined by a head on a stem that is urged into engagement with a seat by a second spring to seal said chamber on movement of said piston by an operational force and develop pressurized fluid in said chamber that is communicated to a brake system to effect a corresponding brake application, said poppet being characterized by a cylindrical body with an annular axial projection that extending therefrom to define a face and a resilient ring that surrounds said annular projection with a lip that axially extends beyond said face, said lip contacting said seal on initial movement of said piston to interrupt communication from said bore to said reservoir, said fluid pressurize in said chamber acting on said cylindrical body to axially compress said resilient ring while radially extruding said lip, said resilient ring being axial compressed and said lip radially extruded until said face contacts said seat to limit the compression of the resilient ring.

* * * * *